(12) United States Patent
Baker

(10) Patent No.: US 11,221,493 B1
(45) Date of Patent: Jan. 11, 2022

(54) VIRTUAL REALITY BODY SUIT ASSEMBLY

(71) Applicant: Jamaul Baker, Elk Grove, CA (US)

(72) Inventor: Jamaul Baker, Elk Grove, CA (US)

( * ) Notice: Subject to any disclaimer, the term of this patent is extended or adjusted under 35 U.S.C. 154(b) by 0 days.

(21) Appl. No.: 17/166,432

(22) Filed: Feb. 3, 2021

(51) Int. Cl.
*G02B 27/01* (2006.01)
*G06F 3/01* (2006.01)
*G06T 19/00* (2011.01)

(52) U.S. Cl.
CPC ......... *G02B 27/0176* (2013.01); *G06F 3/012* (2013.01); *G06F 3/014* (2013.01); *G06F 3/017* (2013.01); *G06T 19/006* (2013.01)

(58) Field of Classification Search
CPC .......... G06F 3/017; G06F 3/011; G06F 1/163; G01S 11/14; G02B 2027/0138
See application file for complete search history.

(56) References Cited

U.S. PATENT DOCUMENTS

| | | | |
|---|---|---|---|
| 6,070,269 A * | 6/2000 | Tardif | G06F 3/011 |
| | | | 2/69 |
| D629,568 S | 12/2010 | Reynolds | |
| 9,652,037 B2 | 5/2017 | Rubin | |
| 9,901,816 B2 * | 2/2018 | Lee | A63F 13/214 |
| 10,462,898 B2 * | 10/2019 | Longinotti-Buitoni | |
| | | | D06P 1/5285 |
| 10,642,368 B2 * | 5/2020 | Chen | G06F 3/0346 |
| 2005/0012485 A1 * | 1/2005 | Dundon | G06F 3/011 |
| | | | 318/568.11 |
| 2009/0189974 A1 * | 7/2009 | Deering | G02B 27/017 |
| | | | 348/46 |
| 2011/0249122 A1 * | 10/2011 | Tricoukes | G06F 1/163 |
| | | | 348/158 |
| 2012/0293935 A1 * | 11/2012 | Sherlock | G06F 1/1666 |
| | | | 361/679.03 |
| 2015/0049004 A1 * | 2/2015 | Deering | G02B 27/0093 |
| | | | 345/8 |
| 2017/0024024 A1 * | 1/2017 | Khan | G06F 3/0346 |
| 2017/0188947 A1 * | 7/2017 | Connor | A61B 5/291 |
| 2017/0192496 A1 * | 7/2017 | Balslev | G06T 13/40 |
| 2017/0262049 A1 * | 9/2017 | Kim | G02B 27/017 |
| 2018/0260023 A1 | 9/2018 | Perlin | |
| 2019/0004325 A1 * | 1/2019 | Connor | G02B 27/0172 |
| 2019/0188815 A1 | 6/2019 | Bache | |
| 2019/0387168 A1 * | 12/2019 | Smith | G06F 1/1686 |
| 2020/0222262 A1 * | 7/2020 | Northen | A61H 23/0263 |

FOREIGN PATENT DOCUMENTS

WO   WO2015002850    1/2015

* cited by examiner

Primary Examiner — William Lu

(57) ABSTRACT

A virtual reality body suit assembly for participating in virtual reality includes a body suit and a plurality of body motion sensors integrated into the body suit to sense motion of respective parts of the person's body when the person wears the body suit. A personal electronic device is removably attachable to the body suit and the personal electronic device is in communication with each of the body motion sensors. Additionally, the personal electronic device is in wireless communication with a remote data server thereby facilitating the personal electronic device to communicate motion data received from the body motion sensors to a virtual reality program on the remote data server. In this way the personal electronic device facilitates the person to participate in the virtual reality program.

10 Claims, 8 Drawing Sheets

VIRTUAL REALITY BODY SUIT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to virtual reality devices and more particularly pertains to a new virtual reality device for participating in virtual reality. The virtual reality device includes a body suit with motion sensors. A personal electronic device is attachable to the body suit and is in communication with the motion sensors. The personal electronic device communicates motion data to a remote data server that stores a virtual reality simulation.

(2) Description of Related Art Including Information Disclosed Under 37 CFR 1.97 and 1.98

The prior art relates to virtual reality devices including a variety of body suits that have an array of motion sensors integrated therein for participating in a virtual reality simulation. The prior art discloses a virtual reality device that facilitates a spectator of a live performance to virtually experience the perspective of a performer. In no instance does the prior art disclose a body suit with motions sensors integrated therein and a personal electronic device that facilitates communication between the motion sensors and a virtual reality simulation.

BRIEF SUMMARY OF THE INVENTION

An embodiment of the disclosure meets the needs presented above by generally comprising a body suit and a plurality of body motion sensors integrated into the body suit to sense motion of respective parts of the person's body when the person wears the body suit. A personal electronic device is removably attachable to the body suit and the personal electronic device is in communication with each of the body motion sensors. Additionally, the personal electronic device is in wireless communication with a remote data server thereby facilitating the personal electronic device to communicate motion data received from the body motion sensors to a virtual reality program on the remote data server. In this way the personal electronic device facilitates the person to participate in the virtual reality program.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
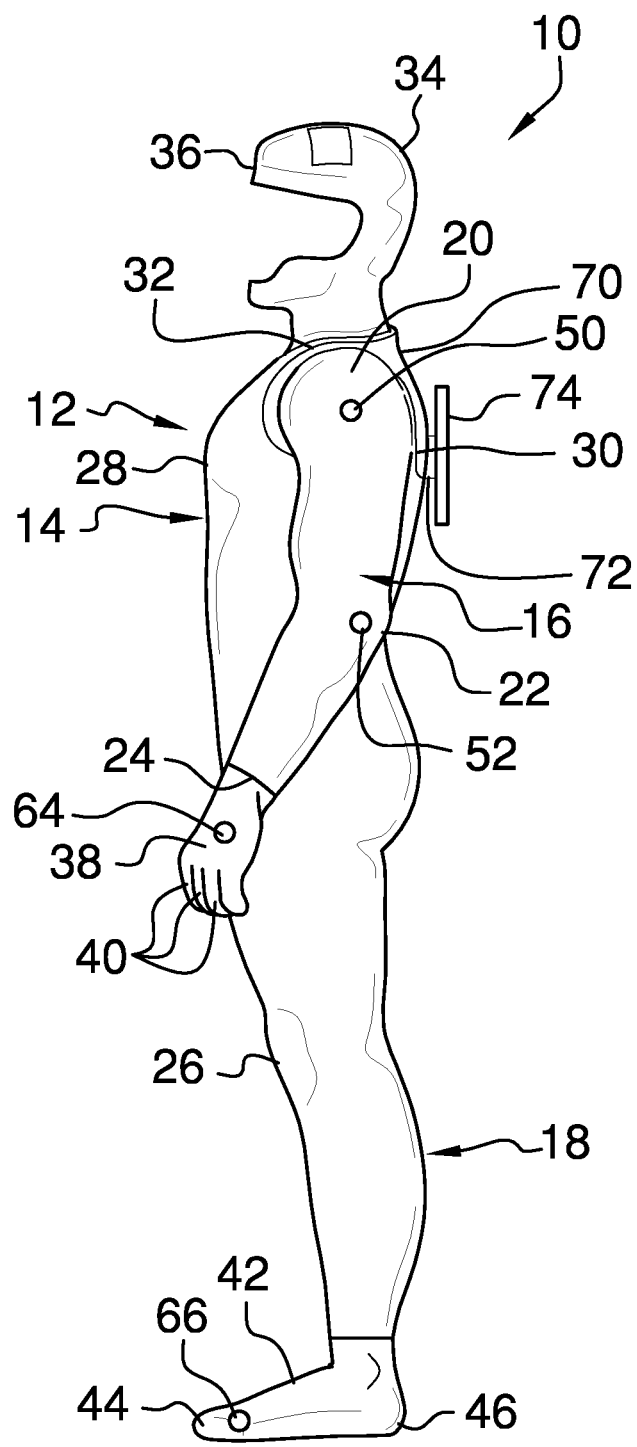
FIG. 1 is a left side view of a body suit of a virtual reality body suit assembly according to an embodiment of the disclosure.
Figure 2:
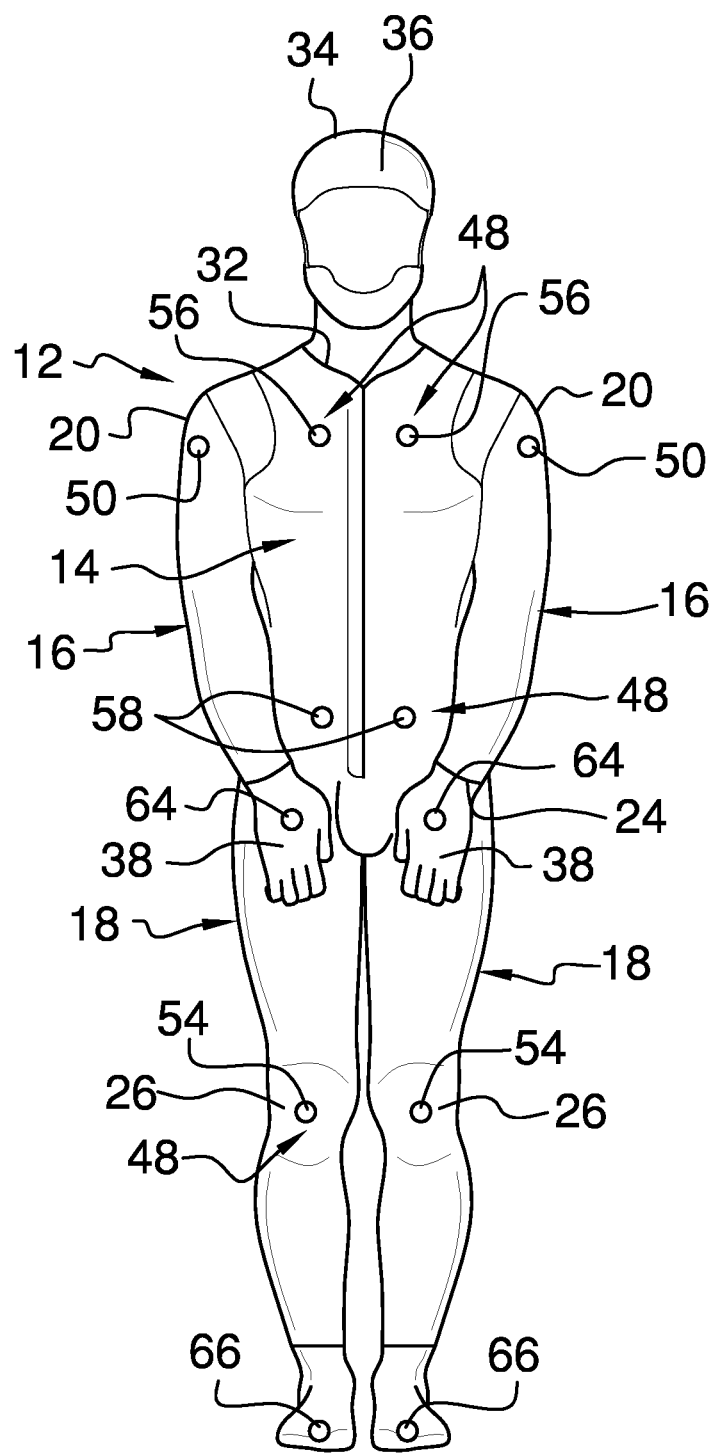
FIG. 2 is a front view of a body suit of an embodiment of the disclosure.
Figure 3:
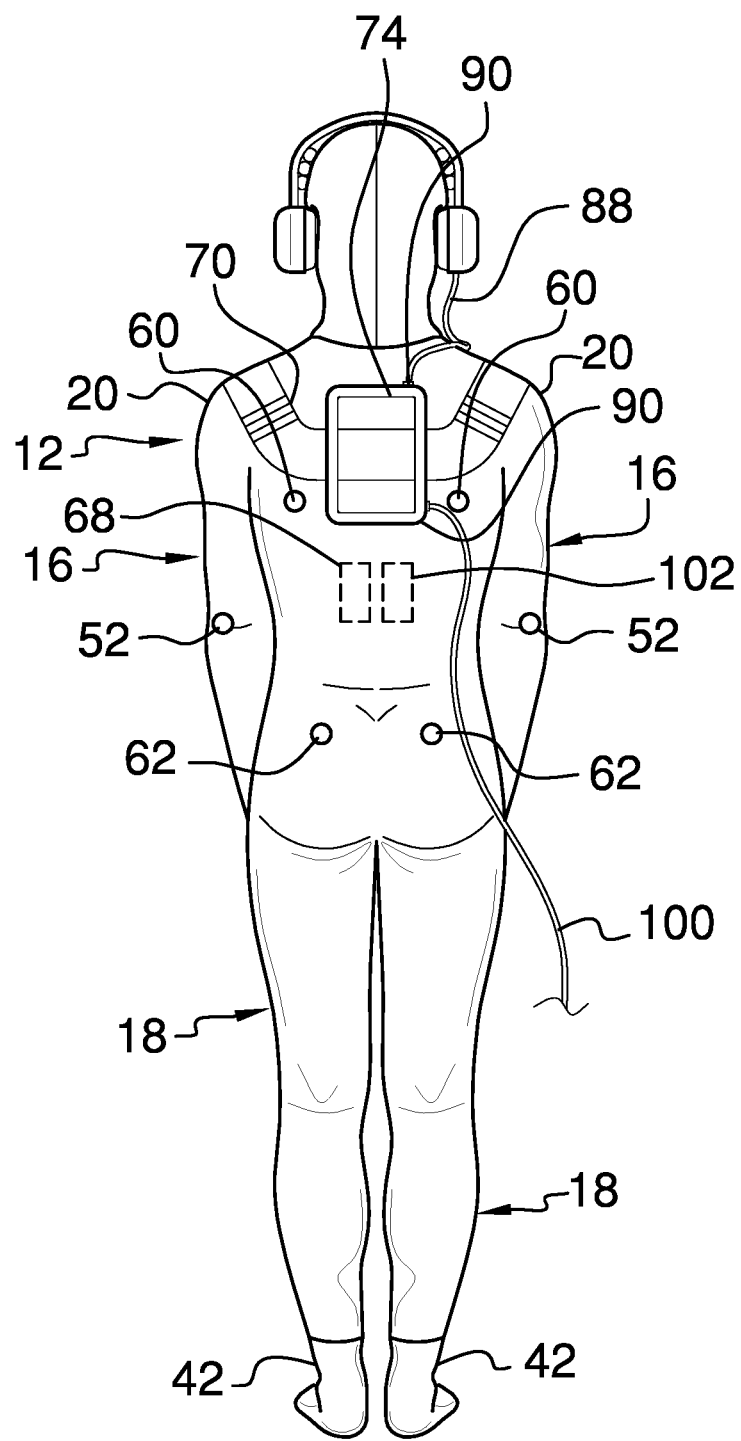
FIG. 3 is a back view of a body suit of an embodiment of the disclosure.
Figure 4:
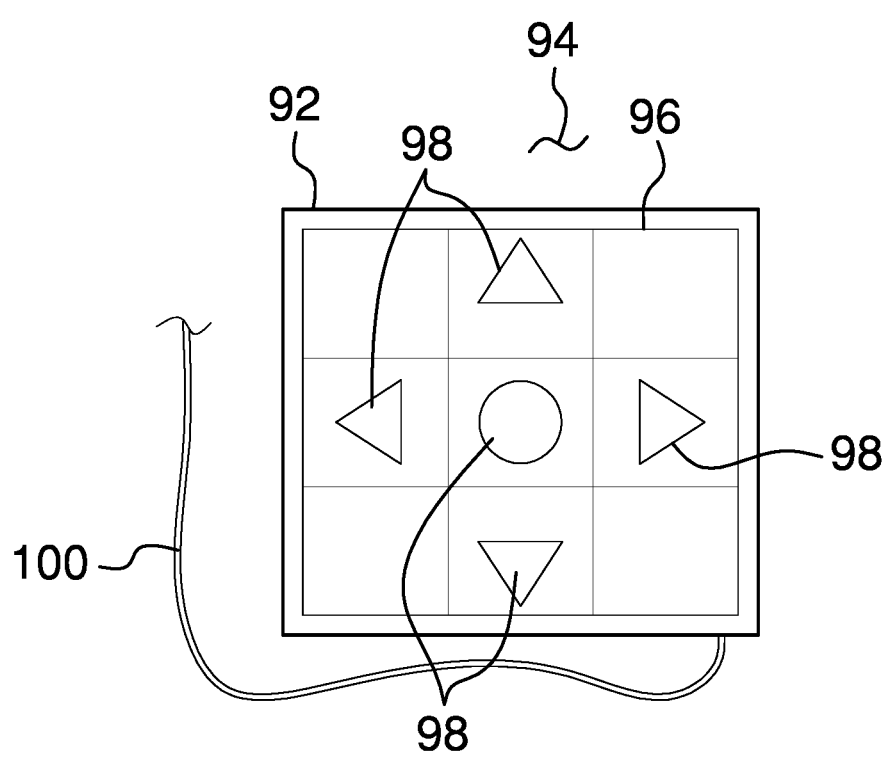
FIG. 4 is a top view of platform of an embodiment of the disclosure.
Figure 5:
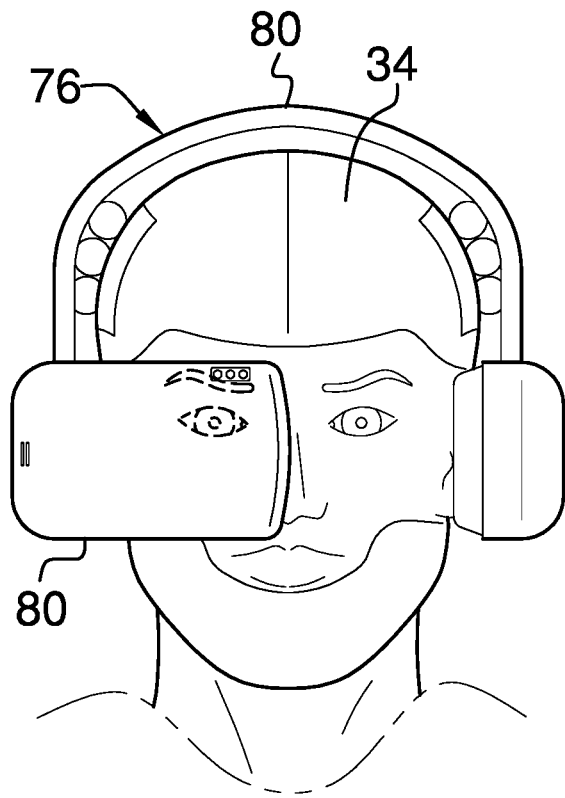
FIG. 5 is a perspective in-use view of a headset of an embodiment of the disclosure.
Figure 6:
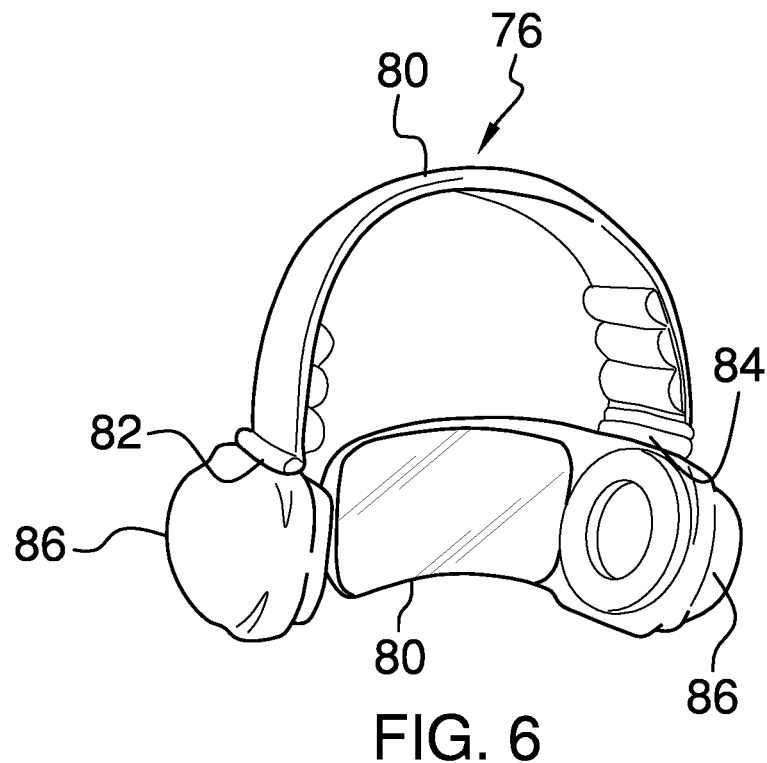
FIG. 6 is a rear perspective view of a headset of an embodiment of the disclosure.
Figure 7:
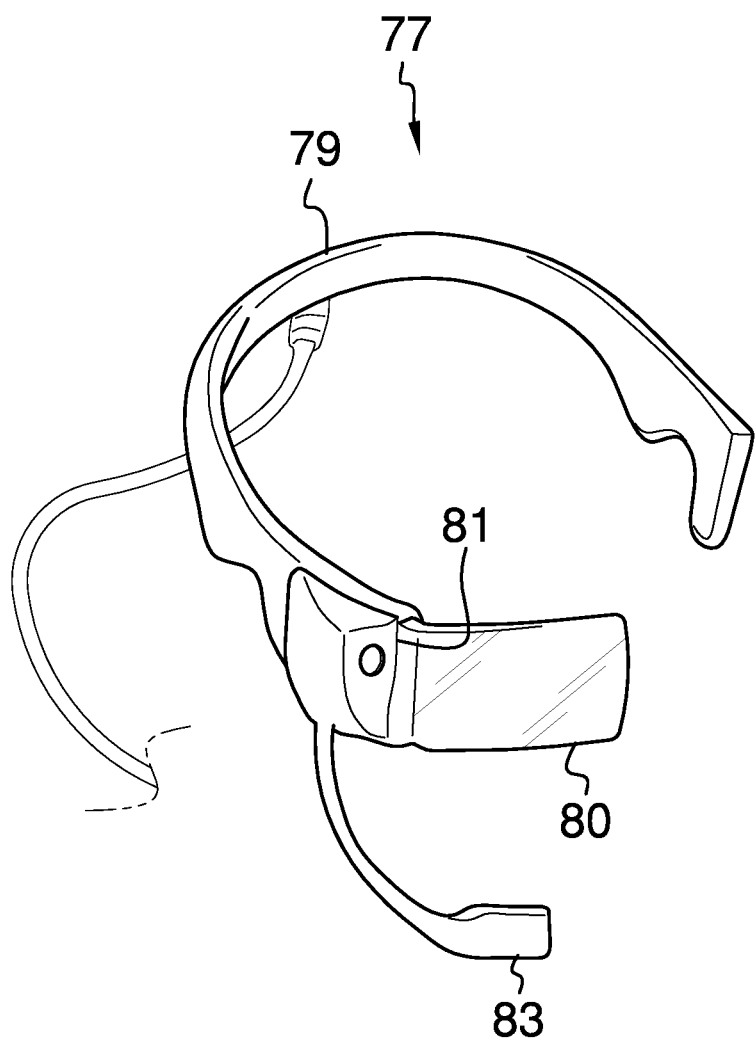
FIG. 7 is a front perspective view of an alternative embodiment of the disclosure.
Figure 8:
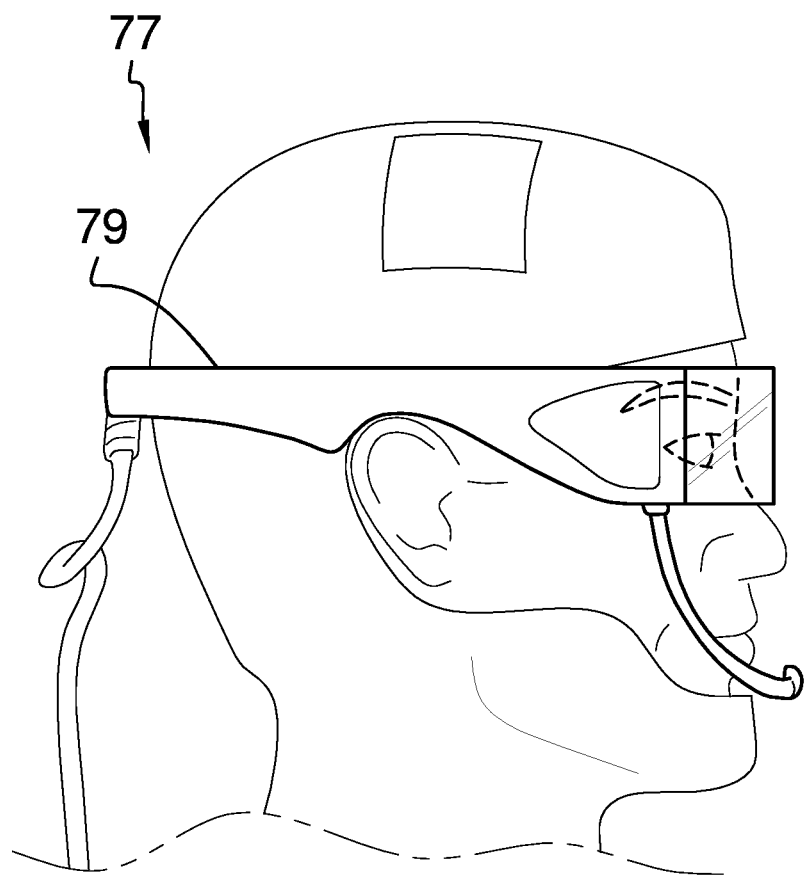
FIG. 8 is a perspective in-use view of an alternative embodiment of the disclosure.
Figure 9:
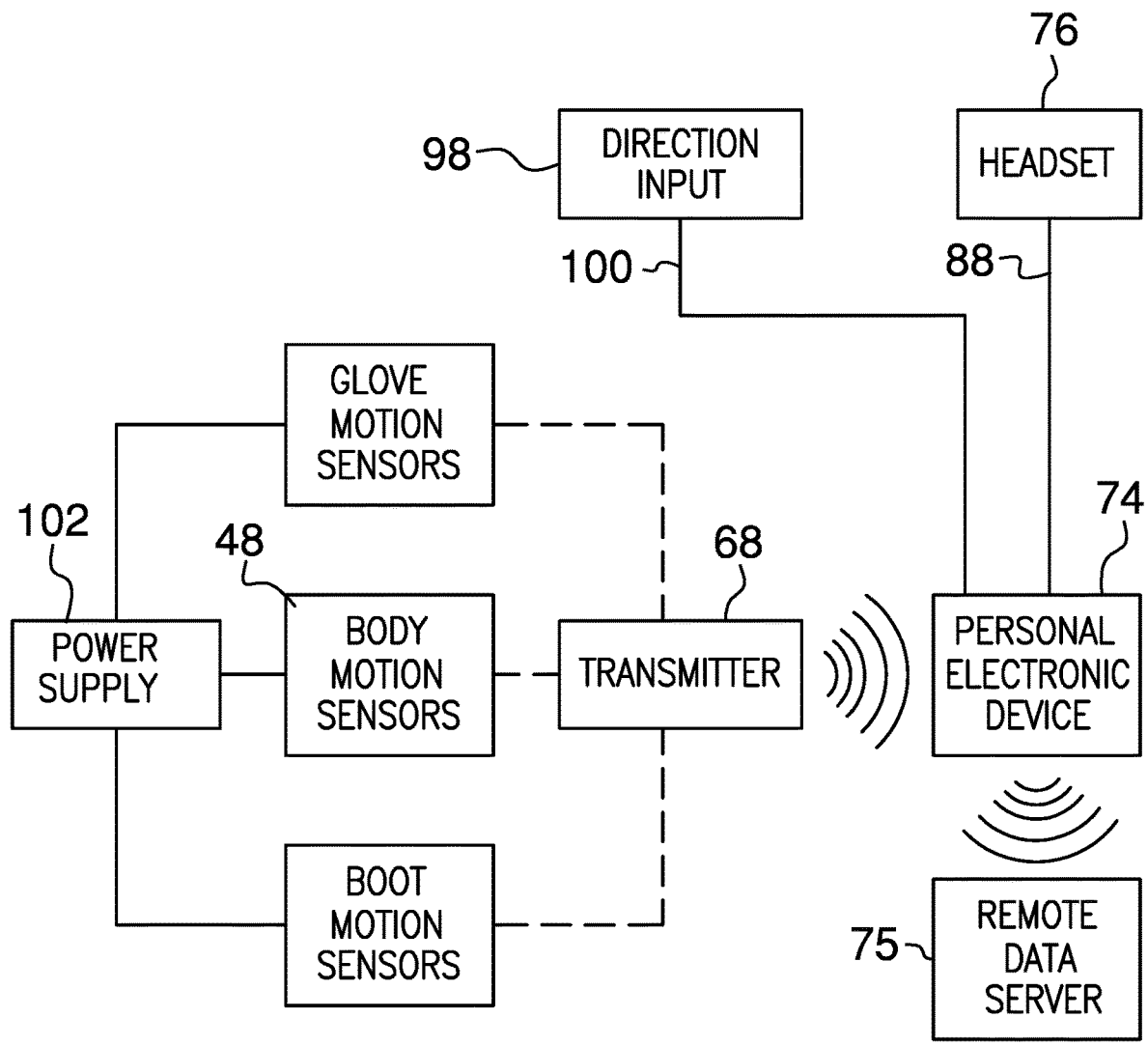
FIG. 9 is a schematic view of an embodiment of the disclosure.

With reference now to the drawings, and in particular to FIGS. 1 through 9 thereof, a new virtual reality device embodying the principles and concepts of an embodiment of the disclosure and generally designated by the reference numeral 10 will be described.

As best illustrated in FIGS. 1 through 9, the virtual reality body suit assembly 10 generally comprises a body suit 12 that has a torso 14, a pair of sleeves 16 and a pair of legs 18 such that the body suit 12 can be worn on a person's body. Each of the sleeves 16 has a shoulder 20, an elbow 22 and a cuff 24, and each of the legs 18 has a knee 26. The torso 14 has a front side 28 and a back side 30, and the torso 14 has a neck opening 32 therein to accommodate the person's neck. The body suit 12 has a hood 34 extending upwardly from the torso 14 and the hood 34 is aligned with the neck opening 32 such that the hood 34 can be worn over the person's head. The hood 34 has a forward side 36 and the forward side 36 is open to expose the person's face. A pair of gloves 38 is provided and each of the gloves 38 has a plurality of fingers 40 such that each of the gloves 38 can be worn on the person's hands. A pair of boots 42 is provided and each of the boots 42 has a toe 44 and a heel 46 for wearing on the person's feet.

A plurality of body motion sensors 48 is provided and each of the body motion sensors 48 is integrated into the body suit 12. Each of the motions sensors is positioned at strategic locations on the body suit 12 to sense motion of respective parts of the person's body when the person wears the body suit 12. The plurality of body motion sensors 48 includes a pair of shoulder sensors 50, a pair of elbow sensors 52, a pair of knee sensors 54, a pair of front upper torso sensors 56, a pair of front lower torso sensors 58, a pair of back upper torso sensors 60 and a pair of back lower torso sensors 62. Additionally, each of the body motion sensors 48 may comprise an electronic motion sensor that includes a wireless transmitter for broadcasting motion data. The body motion sensors 48 may additionally include an array of electrical conductors that is integrated into the body suit 12.

A pair of glove motion sensors 64 is provided and each of the glove motion sensors 64 is integrated into a respective one of the gloves 38 to sense motion of the person's hands. A pair of boot motion sensors 66 is provided and each of the boot motion sensors 66 is integrated into a respective one of the boots 42 to sense motion of the person's feet. Each of the boot sensors is positioned on the toe 44 of the respective boot. Additionally, each of the glove motion sensors 64 and each of the boot motion sensors 66 may include a camera that can capture imagery and an electronic motion sensor that might include a wireless transmitter for broadcasting image data and motion data.

A transmitter 68 is integrated into the body suit 12 and the transmitter 68 is electrically coupled to each of the body motion sensors 48, the glove motion sensors 64 and the boot motion sensors 66. Additionally, the transmitter 68 broadcasts motion data received from each of the body motion sensors 48, the glove motion sensors 64 and the boot motion sensors 66. The transmitter 68 may comprise a radio frequency transmitter or the like. Additionally, the transmitter 68 may receive the motion data via the potential wireless communication capabilities of the body motion sensors 48, the glove motion sensors 64 and the boot motion sensors 66. The transmitter 68 might also be electrically coupled to the array of electrical conductors that might be electrically coupled to each of the body motion sensors 48, the glove motions sensors and the boot motion sensors 66.

A harness 70 is integrated into the body suit 12 and the harness 70 curves laterally across the torso 14. The harness 70 is positioned on the back side 30 of the torso 14 and the harness 70 extends between the shoulder 20 of each of the sleeves 16. The harness 70 has a connection means 72 that is integrated therein and the connection means 72 is centrally positioned between the shoulder 20 of each of the sleeves 16. The connection means 72 might be a smart phone holder, a pair of grips that are urgeable toward or away from each other, or any other mechanical means of releasably engaging an electronic device.

A personal electronic device 74 is removably attachable to the connection means 72 on the harness 70 thereby facilitating the personal electronic device 74 to be worn on the person. The personal electronic device 74 is in communication with each of the body motion sensors 48, each of the glove motion sensors 64 and each of the boot motion sensors 66. The personal electronic device 74 is in wireless communication with a remote data server 75 thereby facilitating the personal electronic device 74 to communicate motion data received from the body motion sensors 48, the glove motion sensors 64 and the boot motion sensors 66 to a virtual reality program on the remote data server 75. In this way the personal electronic device 74 facilitates the person to participate in the virtual reality program.

The personal electronic device 74 may comprise a smart phone, or other similar type of device, that has wireless communication capabilities which facilitate a wireless connection to the internet. In this way the personal electronic device 74 may communicate with the remote data server 75 via the internet. The personal electronic device 74 additionally stores operational software, such as a smart phone app or the like, that facilitates the person to participate in the virtual reality. The virtual reality simulation may be a live performance of a musician, for example, or other live action performance that would typically be attended by a large audience. The virtual reality simulation and the body suit 12 facilitate the user to remotely attend the live performance.

A headset 76 is included that has a head loop 78 and an eyepiece 80 that is coupled to the head loop 78. The head loop 78 can be worn over the person's head having the eyepiece 80 being aligned with a respective one of the person's eyes. The head loop 78 has a first end 82 and a second end 84, and the head loop 78 is curved between the first end 82 and the second end 84. Additionally, the headset 76 includes a pair of ear phones 86 that is each coupled to a respective one of the first end 82 and the second end 84. In this way each of the ear phones 86 can be aligned with a respective one of the person's ears for emitting audible sound into the person's ears.

The eyepiece 80 curves forwardly from a respective one of the ear phones 86 toward the other of the ear phones 86. The eyepiece 80 might comprise a transparent display, such as a transparent LCD or the like, that is capable is displaying imagery while facilitating the person to see through the eyepiece 80. Each of the ear phones 86 may comprise an electronic speaker or other type of device that is capable of emitting audible sounds. In an alternative embodiment 77 As is most clearly shown in FIGS. 7 and 8, the headset 76 might include a head band 79 that extends around the user's head and the eyepiece 80 may be coupled to a respective end 81 of the head band 79. A microphone 83 may be coupled the head band 77 for receiving spoken words from the user.

A data cable 88 is electrically coupled to the headset 76 and the data cable 88 is removably attachable to a respective data port 90 on the personal electronic device 74. In this way the personal electronic device 74 can communicate video data to the eyepiece 80 and audio data to the pair of earphones. Thus, the headset 76 facilitates the person to see and hear the virtual reality in which they are participating. The data cable 88 may comprise a micro usb cable, a firewire cable or other type of data cable 88 that can be mated to data ports on the personal electronic device 74.

A platform 92 is positionable on a support surface 94 wherein the platform 92 is configured to have the person stand thereon. The platform 92 has a top side 96 and the top side 96 has a plurality of direction inputs 98 is being integrated therein. Additionally, each of the direction inputs 98 can be conscientiously stepped on by the person. The plurality of direction inputs 98 may be pressure sensitive pads, motions sensors, switches or any other type of device that is capable of detecting either the weight of the person's foot, the location of the person's foot, or both.

A motion cable 100 is electrically coupled to the platform 92 and the motion cable 100 is electrically coupled to each of the direction inputs 98. The motion cable 100 is removably attachable to a respective data port 90 on the personal electronic device 74 thereby facilitating the personal electronic device 74 to receive directional data from the direction inputs 98. In this way the platform 92 can facilitate the person to move in the virtual reality in which they are participating. The motion cable 100 might include a micro usb plug, a firewire plug or other type of data plug that is common to smart phones. A power supply 102 is integrated into the body suit 12 and the power supply 102 is in electrical communication with each of the body motion sensors 48, the glove motion sensors 64 and the boot motion sensors 66. The power supply may comprise a battery or a power cord that is pluggable into a female electrical outlet.

In use, the person wears the body suit 12, the hood 34, the gloves 38 and the boots 42 and the personal electronic device 74 is coupled to the connection means 72 on the harness 70. The data cable 88 is plugged into the personal electronic device 74 and the motion cable 100 is plugged into the personal electronic device 74. Additionally, the personal electronic device 74 is placed in communication with the remote data server 75. In this way the motion data from the body motion sensors 48, the glove motion sensors 64 and the boot motion sensors 66 is communicated to the remote data server 75 to facilitate the person to participate in the virtual reality. Additionally, the headset 76 receives audio and video data from the remote data server 75 to facilitate the person to hear and see in the virtual reality. Further, the person can stand on the platform 92 and step upon or stand upon desired direction inputs 98 to facilitate the person to move in the virtual reality.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A virtual reality body suit assembly for facilitating a user to participate in a full body virtual reality, said assembly comprising:
    a body suit having a torso, a pair of sleeves and a pair of legs wherein said body suit is configured to be worn on a person's body;
    a plurality of body motion sensors, each of said body motion sensors being integrated into said body suit, each of said motions sensors being positioned at strategic locations on said body suit wherein each of said body motion sensors is configured to sense motion of respective parts of the person's body when the person wears said body suit;
    a pair of gloves, each of said gloves having a plurality of fingers wherein each of said gloves is configured to be worn on the person's hands; and
    a pair of boots, each of said boots having a toe and a heel wherein said pair of boots is configured to be worn on the person's feet;
    a pair of glove motion sensors, each of said glove motion sensors being integrated into a respective one of said gloves wherein each of said glove motion sensors is configured to sense motion of the person's hands; and
    a pair of boot motion sensors, each of said boot motion sensors being integrated into a respective one of said boots wherein each of said boot sensors is configured to sense motion of the person's feet;
    a harness being integrated into said body suit, said harness extending between said shoulder of each of said sleeves, said harness having a connection means being integrated therein;
    a personal electronic device being removably attachable to said connection means on said harness wherein said personal electronic device is configured to be worn on the person, said personal electronic device being in communication with each of said body motion sensors, each of said glove motion sensors and each of said boot motion sensors, said personal electronic device being in wireless communication with a remote data server thereby facilitating said personal electronic device to communicate motion data received from said body motion sensors, said glove motion sensors and said boot motion sensors to a virtual reality program on the remote data server wherein said personal electronic device is configured to facilitate the person to participate in the virtual reality program; and
    a headset having a head loop and an eyepiece being coupled to said head loop wherein said head loop is configured to be worn over the person's head having said eyepiece being aligned with a respective one of the person's eyes, said headset being in electrical communication with said personal electronic device wherein said headset is configured to facilitate the person to interact with the virtual reality program in which they are participating.

2. The assembly according to claim 1, wherein each of said sleeves has a shoulder, an elbow and a cuff, each of said legs having a knee, said torso having a front side and a back side, said torso having a neck opening therein wherein said neck opening is configured to accommodate the person's neck, said body suit having a hood extending upwardly from said torso, said hood being aligned with said neck opening wherein said hood is configured to be worn over the person's head, said hood having a forward side, said forward side being open wherein said forward side is configured to expose the person's face.

3. The assembly according to claim 2, wherein said plurality of body motion sensors includes a pair of shoulder sensors, a pair of elbow sensors, a pair of knee sensors, a pair of front upper torso sensors, a pair of front lower torso sensors, a pair of back upper torso sensors and a pair of back lower torso sensors.

4. The assembly according to claim 3, wherein each of said shoulder sensors is positioned on said shoulder of a receptive one of said sleeves, each of said elbow sensors being positioned on said elbow of a respective one of said sleeves, each of said knee sensors being positioned on said knee of a respective one of said legs, each of said front upper torso sensors being positioned on an upper half of said front side of said torso, each of said front lower torso sensors being positioned on a lower half of said front side of said torso, each of said back upper torso sensors being positioned on an upper half of said back side of said torso, each of said back lower torso sensors being positioned on a lower half of said back side of said torso.

5. The assembly according to claim 1, further comprising a transmitter being integrated into said body suit, said transmitter being electrically coupled to each of said body motions sensors, said glove motion sensors and said boot motion sensor, said transmitter broadcasting motion data received from each of said body motion sensors, said glove motion sensor and said boot motion sensor.

6. The assembly according to claim 2, wherein said harness curves laterally across said torso, said harness being positioned on said back side of said torso, said connection means being centrally positioned between said shoulder of each of said sleeves.

7. The assembly according to claim 1, wherein said head loop has a first end and a second end, said head loop being curved between said first end and said second end, said headset including a pair of ear phones each being coupled to a respective one of said first end and said second end wherein each of said ear phones is configured to be aligned with a respective one of the person's ears for emitting audible sound into the person's ears, said eyepiece curving forwardly from a respective one of said ear phones toward the other of said ear phones.

8. The assembly according to claim 1, further comprising a platform being positionable on a support surface wherein said platform is configured to have the person stand thereon, said platform having a top side, said top side having a plurality of direction inputs being integrated therein wherein each of said direction inputs is configured to be conscientiously stepped on by the person.

9. The assembly according to claim 8, further comprising a motion cable being electrically coupled to said platform, said motion cable being electrically coupled to each of said direction inputs, said motion cable being removably attachable to a data port on said personal electronic device thereby facilitating said personal electronic device to receive directional data from said direction inputs wherein said platform is configured to facilitate the person to move in the virtual reality in which they are participating.

10. A virtual reality body suit assembly for facilitating a user to participate in a full body virtual reality, said assembly comprising:
   a body suit having a torso, a pair of sleeves and a pair of legs wherein said body suit is configured to be worn on a person's body, each of said sleeves having a shoulder, an elbow and a cuff, each of said legs having a knee, said torso having a front side and a back side, said torso having a neck opening therein wherein said neck opening is configured to accommodate the person's neck, said body suit having a hood extending upwardly from said torso, said hood being aligned with said neck opening wherein said hood is configured to be worn over the person's head, said hood having a forward side, said forward side being open wherein said forward side is configured to expose the person's face;
   a pair of gloves, each of said gloves having a plurality of fingers wherein each of said gloves is configured to be worn on the person's hands;
   a pair of boots, each of said boots having a toe and a heel wherein said pair of boots is configured to be worn on the person's feet;
   a plurality of body motion sensors, each of said body motion sensors being integrated into said body suit, each of said motions sensors being positioned at strategic locations on said body suit wherein each of said body motion sensors is configured to sense motion of respective parts of the person's body when the person wears said body suit, said plurality of body motion sensors including a pair of shoulder sensors, a pair of elbow sensors, a pair of knee sensors, a pair of front upper torso sensors, a pair of front lower torso sensors, a pair of back upper torso sensors and a pair of back lower torso sensors;
   a pair of glove motion sensors, each of said glove motion sensors being integrated into a respective one of said gloves wherein each of said glove motion sensors is configured to sense motion of the person's hands;
   a pair of boot motion sensors, each of said boot motion sensors being integrated into a respective one of said boots wherein each of said boot sensors is configured to sense motion of the person's feet, each of said boot sensors being positioned on said toe of said respective boot;
   a transmitter being integrated into said body suit, said transmitter being electrically coupled to each of said body motions sensors, said glove motion sensors and said boot motion sensor, said transmitter broadcasting motion data received from each of said body motion sensors, said glove motion sensor and said boot motion sensor;
   a harness being integrated into said body suit, said harness curving laterally across said torso, said harness being positioned on said back side of said torso, said harness extending between said shoulder of each of said sleeves, said harness having a connection means being integrated therein, said connection means being centrally positioned between said shoulder of each of said sleeves;
   a personal electronic device being removably attachable to said connection means on said harness wherein said personal electronic device is configured to be worn on the person, said personal electronic device being in communication with each of said body motion sensors, each of said glove motion sensors and each of said boot motion sensors, said personal electronic device being in wireless communication with a remote data server thereby facilitating said personal electronic device to communicate motion data received from said body motion sensors, said glove motion sensors and said boot motion sensors to a virtual reality program on the remote data server wherein said personal electronic device is configured to facilitate the person to participate in the virtual reality program;
   a headset having a head loop and an eyepiece being coupled to said head loop wherein said head loop is configured to be worn over the person's head having said eyepiece being aligned with a respective one of the person's eyes, said head loop having a first end and a second end, said head loop being curved between said first end and said second end, said headset including a pair of ear phones each being coupled to a respective one of said first end and said second end wherein each of said ear phones is configured to be aligned with a respective one of the person's ears for emitting audible sound into the person's ears, said eyepiece curving forwardly from a respective one of said ear phones toward the other of said ear phones;
   a data cable being electrically coupled to said headset, said data cable being removably attachable to a data port on said personal electronic device thereby facilitating said personal electronic device to communicate video data to said eyepiece and audio data to said pair of earphones wherein said headset is configured to facilitate the person to see and hear the virtual reality in which they are participating;

a platform being positionable on a support surface wherein said platform is configured to have the person stand thereon, said platform having a top side, said top side having a plurality of direction inputs being integrated therein wherein each of said direction inputs is configured to be conscientiously stepped on by the person;

a motion cable being electrically coupled to said platform, said motion cable being electrically coupled to each of said direction inputs, said motion cable being removably attachable to a data port on said personal electronic device thereby facilitating said personal electronic device to receive directional data from said direction inputs wherein said platform is configured to facilitate the person to move in the virtual reality in which they are participating; and a power supply being integrated into said body suit, said power supply being in electrical communication with each of said body motion sensors, said glove motion sensors and said boot motion sensors.

* * * * *